(12) United States Patent
Boland

(10) Patent No.: US 7,128,164 B1
(45) Date of Patent: Oct. 31, 2006

(54) VEHICLE MOUNTED EDGING WHEEL SYSTEM

(76) Inventor: Thomas C. Boland, 1512 Georgia Ave., Palm Harbor, FL (US) 34683

( * ) Notice: Subject to any disclaimer, the term of this patent is extended or adjusted under 35 U.S.C. 154(b) by 0 days.

(21) Appl. No.: 11/196,125

(22) Filed: Aug. 3, 2005

(51) Int. Cl.
*A01D 34/00* (2006.01)

(52) U.S. Cl. .......................... 172/15; 172/17; 56/13.7; 56/256

(58) Field of Classification Search .................. 172/15, 172/16, 17, 464, 572, 518; 56/16.9, 13.7, 56/256
See application file for complete search history.

(56) References Cited

U.S. PATENT DOCUMENTS

| | | | |
|---|---|---|---|
| 4,046,200 A | 9/1977 | Mullet et al. | |
| 4,200,155 A * | 4/1980 | Mullet et al. | 172/14 |
| 4,318,267 A | 3/1982 | Green | |
| 4,629,006 A * | 12/1986 | Mullet et al. | 172/15 |
| 4,718,221 A * | 1/1988 | Wessel et al. | 56/16.9 |
| 4,930,580 A | 6/1990 | Fuss et al. | |
| 4,962,598 A | 10/1990 | Woolhiser et al. | |
| 5,065,567 A * | 11/1991 | Wessel et al. | 56/13.7 |
| 5,694,752 A * | 12/1997 | Warfield, III | 56/13.6 |
| 6,125,943 A * | 10/2000 | Valois | 172/15 |
| 2005/0126798 A1* | 6/2005 | Pulvirenti | 172/17 |

* cited by examiner

*Primary Examiner*—Victor Batson
(74) *Attorney, Agent, or Firm*—Edward P. Dutkiewicz

(57) ABSTRACT

A support has a post. The post has a circular cross sectional configuration. The post extends upwardly from the support. An arm has a collar. The collar is rotatably received on the post. The collar is pivotably coupled to the collar with a finger. The finger has a vertical aperture there through. A wheel assembly has a drive wheel centrally and a cutting wheel. The cutting wheel is outboardly and has a diameter greater than the diameter of the drive wheel. The wheel assembly has a clevis. The clevis is inboardly and has vertical aperture and a pin.

4 Claims, 3 Drawing Sheets

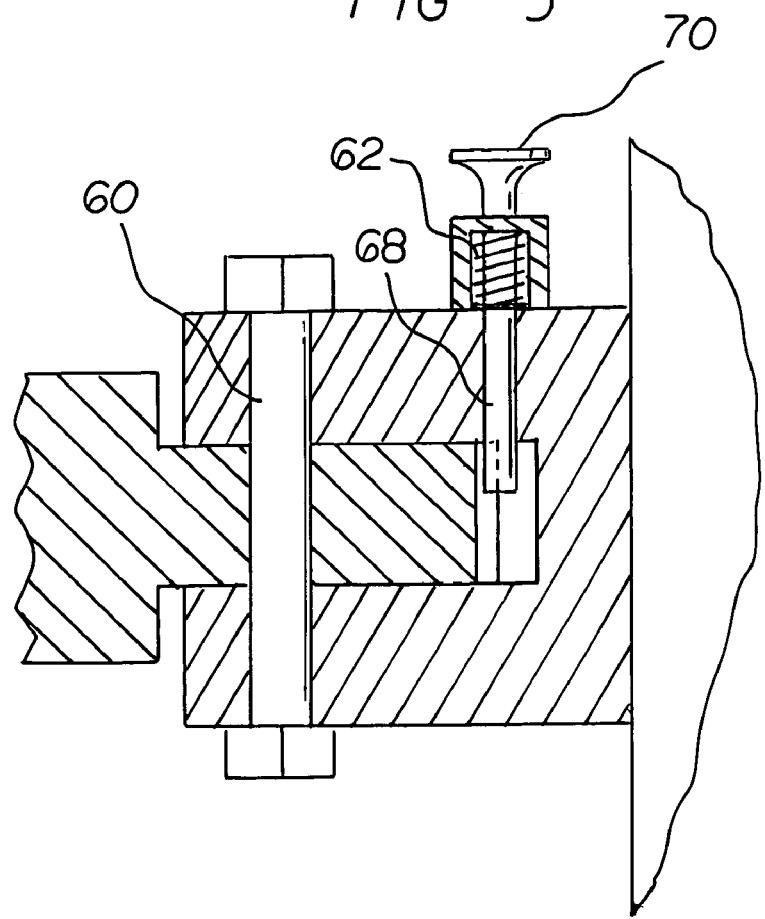
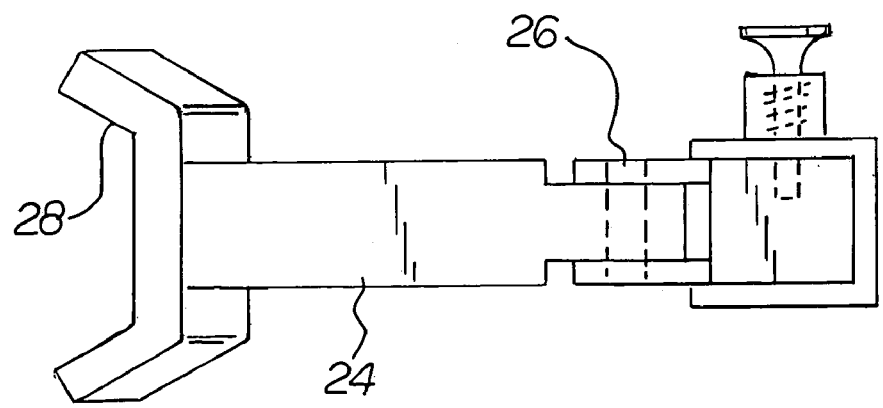

VEHICLE MOUNTED EDGING WHEEL SYSTEM

BACKGROUND OF THE INVENTION

1. Field of the Invention

The present invention relates to a vehicle mounted edging wheel system and more particularly pertains to edging grass and soil adjacent to roadways and curbs in a safe and convenient manner.

2. Description of the Prior Art

The use of lawn edgers of known designs and configurations is known in the prior art. More specifically, lawn edgers of known designs and configurations previously devised and utilized for the purpose of edging grass through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,046,200 issued Sep. 6, 1977 to Mullet relates to a lawn edger attachment. U.S. Pat. No. 4,318,267 issued Mar. 9, 1982 to Green relates to a grass edging device. U.S. Pat. No. 4,962,598 issued Oct. 16, 1990 to Woodhiser relates to apparatus for mounting implements on vehicles. Lastly, U.S. Pat. No. 4,930,580 issued Jun. 5, 1990 to Fuss relates to a vehicle mounted lawn edger.

While these devices fulfill their respective, particular objectives and requirements, the aforementioned patents do not describe vehicle mounted edging wheel system that allows edging grass and soil adjacent to roadways and curbs in a safe and convenient manner.

In this respect, the vehicle mounted edging wheel system according to the present invention substantially departs from the conventional concepts and designs of the prior art, and in doing so provides an apparatus primarily developed for the purpose of edging grass and soil adjacent to roadways and curbs in a safe and convenient manner.

Therefore, it can be appreciated that there exists a continuing need for a new and improved vehicle mounted edging wheel system which can be used for edging grass and soil adjacent to roadways and curbs in a safe and convenient manner. In this regard, the present invention substantially fulfills this need.

SUMMARY OF THE INVENTION

In view of the foregoing disadvantages inherent in the known types of lawn edgers of known designs and configurations now present in the prior art, the present invention provides an improved vehicle mounted edging wheel system. As such, the general purpose of the present invention, which will be described subsequently in greater detail, is to provide a new and improved vehicle mounted edging wheel system and method which has all the advantages of the prior art and none of the disadvantages.

To attain this, the present invention essentially comprises a rigid primary support. The primary support is in a linear configuration. The primary support is in a rectangular, preferably square, cross sectional configuration. The primary support has an opening at each end. The opening extends through the primary support. The primary support has brackets and bolts. The brackets and bolts secure the primary support to the front of a vehicle. The primary support has an extension piece. The extension piece is slidably received within each opening. The extension piece has a vertical aperture. The vertical aperture extends through the support. The vertical aperture is adjacent to each end. The extension piece has spaced vertical apertures. The spaced vertical apertures extend through each extension piece. A pin is provided. The pin is positionable through each aperture of the support. A preselected aperture of the extension piece secures the extension piece at a predetermined position. A pivotable component is provided. A vertical axis is provided. The pivotable component is secured to each extension piece about a vertical axis. A generally C-shaped guide member is provided on the end of each pivotable component. A post is provided. The post has a circular cross sectional configuration. The post extends upwardly from the support adjacent to its midpoint.

An arm is provided. The arm has an exterior segment. The arm has an interior segment. The arm also has a collar. The collar is rotatably received on the post. A horizontal first axis is provided. The interior segment is pivotably coupled to the collar about the horizontal first axis. A horizontal second axis is provided. The horizontal second axis pivotably couples the exterior segment and the interior segment. The arm has a finger. A horizontal pivot point is provided. The finger is pivotably coupled to the exterior segment about the horizontal pivot point. A vertical aperture is provided through the finger.

Provided next is a wheel assembly. The wheel assembly has a drive wheel centrally which is adapted to ride on an edge of a roadway. The central drive wheel is further adapted to be rotated by movement along the roadway. The wheel assembly has a cutting wheel. The cutting wheel is provided outboardly. The cutting wheel has a diameter greater than the diameter of the drive wheel. The cutting wheel is secured to the drive wheel. The cutting wheel is adapted to be rotated with the drive wheel. In this manner the grass and soil adjacent to the drive wheel and cutting wheel is edged. The wheel assembly has a clevis. The clevis is provided inboardly. The clevis has a vertical aperture and a pin. The clevis further has a spring. The spring urges the pin downwardly through the vertical apertures of the clevis and the finger.

Further provided are adjustment components. The adjustment components include teeth. The teeth are provided on the outboard end of the finger. The teeth are provided in an arc of about 180 degrees. Each tooth has crests and semicircular roots. An alignment hole is provided in the clevis. A pin is provided. The alignment hole is aligned with a preselected root and with the pin. The pin is positionable in the alignment hole and one root. In this manner the wheel assembly is secured at a desired angular orientation with respect to the arm. The adjustment component also includes a spring. The spring encompasses the exterior component of the arm and the finger. The spring urges the finger and wheel assembly downwardly. In this manner rolling contact of the drive wheel and the roadway is ensured.

Provided last is a linear actuator. The linear actuator has an inner end. An outer end is provided. The inner end is pivotably secured to the collar about a horizontal axis beneath the arm. The outer end is pivotably secured to the exterior segment adjacent to the finger. A source 82 of pressurized fluid is provided. The source of pressurized fluid drives the actuator to an extended orientation. The source of pressurized fluid also drives the arm to a linear orientation for operation and use. The source of pressurized fluid also drives the actuator to a retracted orientation. The source of pressurized fluid further drives the arm to a folded orientation when not in operation and use. The arm and actuator are adapted to be swung to one side or the other for guidance by one C-shaped support of the vehicle and the other, as a function of the area to be edged.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle mounted edging wheel system which has all of the advantages of the prior art lawn edgers of known designs and configurations and none of the disadvantages.

It is another object of the present invention to provide a new and improved vehicle mounted edging wheel system which may be easily and efficiently manufactured and marketed.

It is further object of the present invention to provide a new and improved vehicle mounted edging wheel system which is of durable and reliable constructions.

An even further object of the present invention is to provide a new and improved vehicle mounted edging wheel system which is susceptible of a low cost of manufacture with regard to both materials and labor, and which accordingly is then susceptible of low prices of sale to the consuming public, thereby making such vehicle mounted edging wheel system economically available to the buying public.

Even still another object of the present invention is to provide a vehicle mounted edging wheel system for edging grass and soil adjacent to roadways and curbs in a safe and convenient manner.

Lastly, it is an object of the present invention to provide a new and improved vehicle mounted edging wheel system. A support has a post. The post has a circular cross sectional configuration. The post extends upwardly from the support. An arm has a collar. The collar is rotatably received on the post. The collar is pivotably coupled to the collar with a finger. The finger has a vertical aperture there through. A wheel assembly has a drive wheel centrally and a cutting wheel. The cutting wheel is outboardly and has a diameter greater than the diameter of the drive wheel. The wheel assembly has a clevis. The clevis is inboardly and has vertical aperture and a pin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross sectional view taken along line 5—5 of FIG. 4.

FIG. 6 is an end elevational view taken along line 6—6 of FIG. 1.

The same reference numerals refer to the same parts throughout the various Figures.

DESCRIPTION OF THE PREFERRED EMBODIMENT

Figure 1:
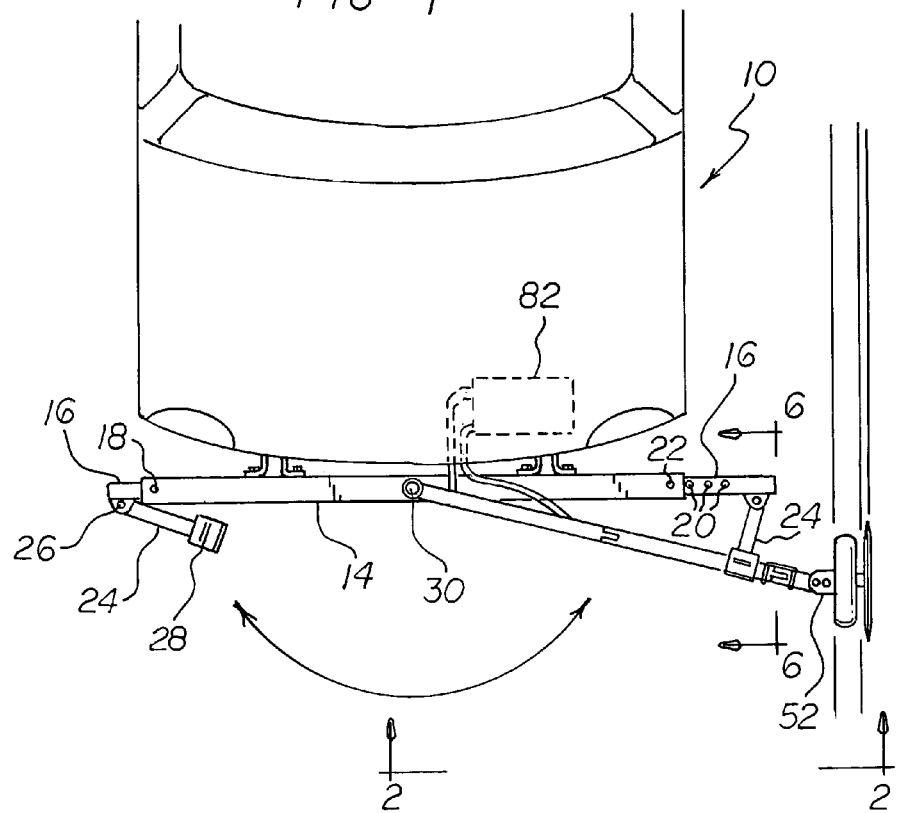
FIG. 1 is a plan view of a vehicle mounted edging wheel system constructed in accordance with the principles of the present invention.
Figure 2:
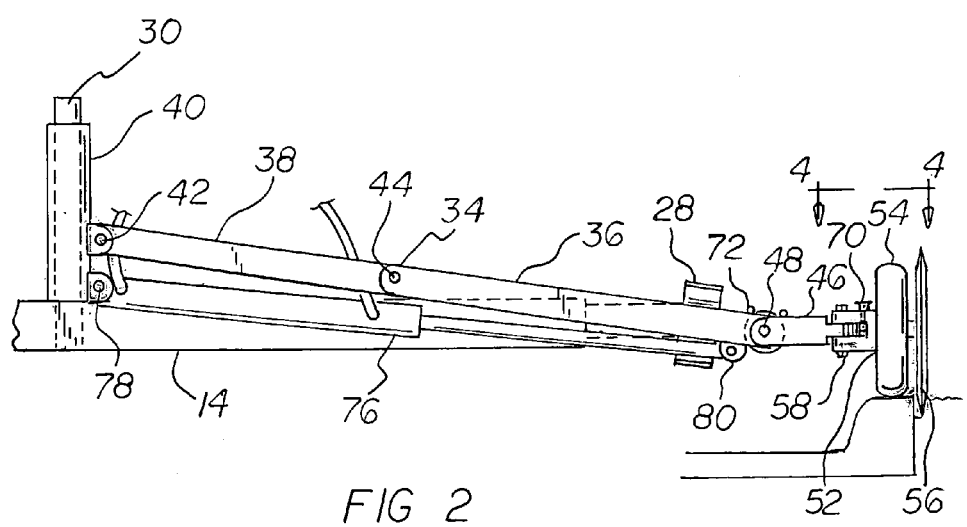
FIG. 2 is a front elevational view taken along line 2—2 of FIG. 1 with the arm and wheels in the extended orientation.
Figure 3:
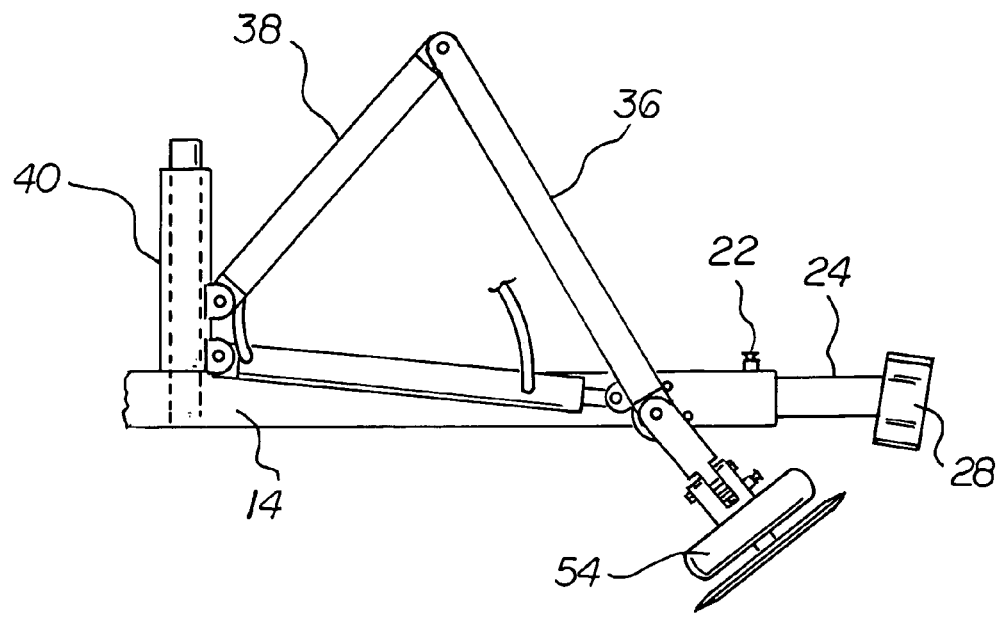
FIG. 3 is a front elevational view similar to FIG. 2 but with the arm and wheels in the retracted orientation.
Figure 4:
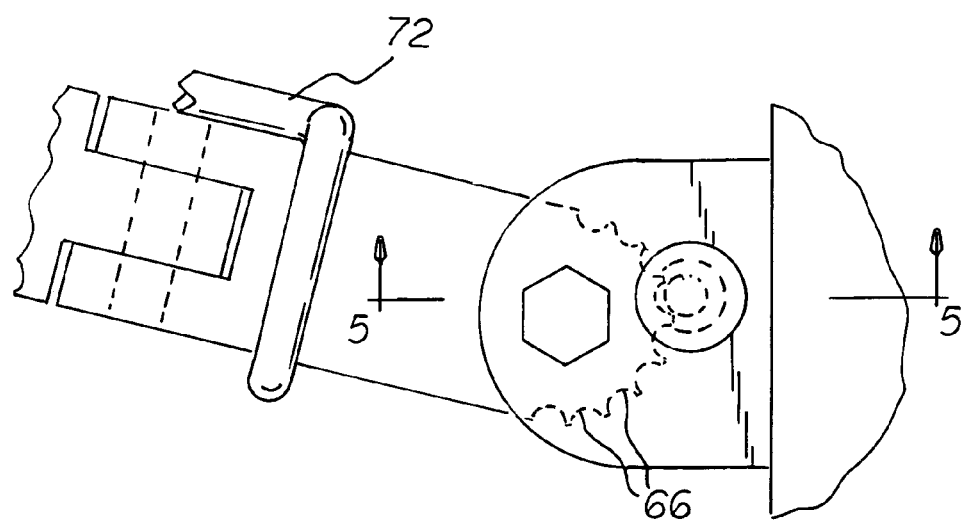
FIG. 4 is an enlarged plan view of the finger and wheels taken along line 4—4 of FIG. 2.

With reference now to the drawings, and in particular to FIG. 1 thereof, the preferred embodiment of the new and improved vehicle mounted edging wheel system embodying the principles and concepts of the present invention and generally designated by the reference numeral 10 will be described.

The present invention, the vehicle mounted edging wheel system 10 is comprised of a plurality of components. Such components in their broadest context include a support, and arm and a wheel assembly. Such components are individually configured and correlated with respect to each other so as to attain the desired objective.

First provided is a rigid primary support 14. The primary support is in a linear configuration. The primary support is in a rectangular, preferably square, cross sectional configuration. The primary support has an opening at each end. The opening extends through the primary support. The primary support has brackets and bolts. The brackets and bolts secure the primary support to the front of a vehicle. The primary support has an extension piece 16. The extension piece is slidably received within each opening. The extension piece has a vertical aperture 18. The vertical aperture extends through the support. The vertical aperture is adjacent to each end. The extension piece has spaced vertical apertures 20. The spaced vertical apertures extend through each extension piece. A pin 22 is provided. The pin is positionable through each aperture of the support. A preselected aperture of the extension piece secures the extension piece at a predetermined position. A pivotable component 24 is provided. A vertical axis is provided 26. The pivotable component is secured to each extension piece about a vertical axis. A generally C-shaped guide member 28 is provided on the end of each pivotable component. A post 30 is provided. The post has a circular cross sectional configuration. The post extends upwardly from the support adjacent to its midpoint.

An arm 34 is provided. The arm has an exterior segment 36. The arm has an interior segment 38. The arm also has a collar 40. The collar is rotatably received on the post. A horizontal first axis is provided. The interior segment is pivotably coupled to the collar about the horizontal first axis 42. A horizontal second axis 44 is provided. The horizontal second axis pivotably couples the exterior segment and the interior segment. The arm has a finger 46. A horizontal pivot point 48 is provided. The finger is pivotably coupled to the exterior segment about the horizontal pivot point. A vertical aperture 50 is provided through the finger.

Provided next is a wheel assembly 52. The wheel assembly has a drive wheel 54 centrally. The central drive wheel is adapted to ride on an edge of a roadway. The central drive wheel is further adapted to be rotated by movement along the roadway. The wheel assembly has a cutting wheel 56. The cutting wheel is provided outboardly. The cutting wheel has a diameter greater than the diameter of the drive wheel. The cutting wheel is secured to the drive wheel. The cutting wheel is adapted to be rotated with the drive wheel. In this manner the grass and soil adjacent to the drive wheel and cutting wheel is edged. The wheel assembly has a clevis 58. The clevis is provided inboardly. The clevis has a vertical aperture and a pin 60. The clevis further has a spring 62. The spring urges the pin downwardly through the vertical apertures of the clevis and the finger.

Further provided are adjustment components. The adjustment components include teeth 66. The teeth are provided on the outboard end of the finger. The teeth are provided in an arc of about 180 degrees. Each tooth has crests and semicircular roots. An alignment hole 68 is provided in the clevis. A pin is provided. The alignment hole is aligned with a preselected root and with the pin. The pin is positionable in the alignment hole and one root. In this manner the wheel assembly is secured at a desired angular orientation with respect to the arm. The adjustment component also includes a spring 72. The spring encompasses the exterior component of the arm and the finger. The spring urges the finger and wheel assembly downwardly. In this manner rolling contact of the drive wheel and the roadway is ensured.

Provided last is a linear actuator 76. The linear actuator has an inner end 78. An outer end is provided 80. The inner end is pivotably secured to the collar about a horizontal axis beneath the arm. The outer end is pivotably secured to the exterior segment adjacent to the finger. A source 82 of pressurized fluid is provided. The source of pressurized fluid drives the actuator to an extended orientation. The source of pressurized fluid also drives the arm to a linear orientation for operation and use. The source of pressurized fluid also drives the actuator to a retracted orientation. The source of pressurized fluid further drives the arm to a folded orientation when not in operation and use. The arm and actuator are adapted to be swung to one side of the vehicle and the other for guidance by one C-shaped support or the other, as a function of the area to be edged.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle mounted edging wheel system comprising:
    a support having a post with a circular cross sectional configuration extending upwardly from the support;
    an arm with a collar rotatably received on the post and pivotably coupled to the collar with a finger having a vertical aperture there through;
    a wheel assembly having a drive wheel centrally and a cutting wheel outboardly with a diameter greater than the diameter of the drive wheel, the wheel assembly having a clevis inboardly with a vertical aperture and a pin; and
adjustment components including teeth on the outboard end of the finger in an arc of about 180 degrees, each tooth having crests and semicircular roots, an alignment hole in the clevis aligned with a or preselected root and with a pin positionable in the alignment hole and one root to secure the wheel assembly at a desired angular orientation with respect to the arm.

2. A vehicle mounted edging wheel system comprising:
    a support having a post with a circular cross sectional configuration extending upwardly from the support;
    an arm with a collar rotatably received on the post and pivotably coupled to the collar with a finger having a vertical aperture there through;
    a wheel assembly having a drive wheel centrally and a cutting wheel outboardly with a diameter greater than the diameter of the drive wheel, the wheel assembly having a clevis inboardly with a vertical aperture and a pin; and
    a spring encompassing the arm and the finger urging the finger and wheel assembly downwardly to ensure rolling contact of the drive wheel on a roadway.

3. A vehicle mounted edging wheel system comprising:
    a support having a post with a circular cross sectional configuration extending upwardly from the support;
    an arm with a collar rotatably received on the post and pivotably coupled to the collar with a finger having a vertical aperture there through;
    a wheel assembly having a drive wheel centrally and a cutting wheel outboardly with a diameter greater than the diameter of the drive wheel, the wheel assembly having a clevis inboardly with a vertical aperture and a pin; and
    a linear actuator having an inner end pivotably secured to the collar about a horizontal axis beneath the arm and an outer end pivotably secured to the arm adjacent to the finger with a source of pressurized fluid to drive the actuator to an extended orientation and the arm to a linear orientation for operation and use and to drive the actuator to a retracted orientation and the arm to a folded orientation when not in operation and use, the arm and actuator adapted to be swung to one side of the vehicle and the other.

4. A vehicle mounted edging wheel system for edging grass and soil adjacent to roadways and curbs in combination:
    a rigid primary support in a linear configuration with a rectangular cross sectional configuration and having an opening at each end extending through the support, and with brackets and bolts securing the support to a vehicle front, the support having an extension piece slidably received within each opening with a vertical aperture extending through the support adjacent to each end and spaced vertical apertures extending through each extension piece and a pin positionable through each aperture of the support and a preselected aperture of the extension piece to secure the extension piece at a predetermined position, a pivotable component secured to each extension piece about a vertical axis with a generally C-shaped guide member on an end of each pivotable component, and a post with a circular cross sectional configuration extending upwardly from the support adjacent to its midpoint;

an arm having an exterior segment and an interior segment with a collar rotatably received on the post, the interior segment being pivotably coupled to the collar about a horizontal first axis, a horizontal second axis pivotably coupling the exterior segment and the interior segment, a finger pivotably coupled to the exterior segment about a horizontal pivot point, the finger having a vertical aperture there through;

a wheel assembly having a drive wheel having a diamter and centrally adapted to ride on an edge of a roadway and be rotated by movement along the roadway, the wheel assembly having a cutting wheel outboardly with a diameter greater than the diameter of the drive wheel and secured there to and adapted to be rotated therewith for edging the grass and soil there adjacent, the wheel assembly having a clevis inboardly with a vertical aperture and a pin and a spring urging the pin downwardly through the vertical apertures of the clevis and the finger;

adjustment components including teeth on the outboard end of the finger in an arc of about 180 degrees, each tooth having crests and semicircular roots, an alignment hole in the clevis aligned with a preselected root and with a pin positionable in the alignment hole and one root to secure the wheel assembly at a desired angular orientation with respect to the arm, the adjustment component also including a spring encompassing an exterior component of the arm and the finger urging the finger and wheel assembly downwardly to ensure rolling contact of the drive wheel and the roadway; and a linear actuator having an inner end pivotably secured to the collar about a horizontal axis beneath the arm and an outer end pivotably secured to the exterior segment adjacent to the finger with a source of pressurized fluid to drive the actuator to an extended orientation and the arm to a linear orientation for operation and use and to drive the actuator to a retracted orientation and the arm to a folded orientation when not in operation and use, the arm and actuator adapted to be swung to one side of the vehicle and the other for guidance by one C-shaped guide member or the other, as a function of the area to be edged.

* * * * *